May 18, 1954
A. I. HONDEVILLE
2,678,844
PORTABLE IRRIGATION SYSTEM
Filed Jan. 14, 1952
2 Sheets-Sheet 1
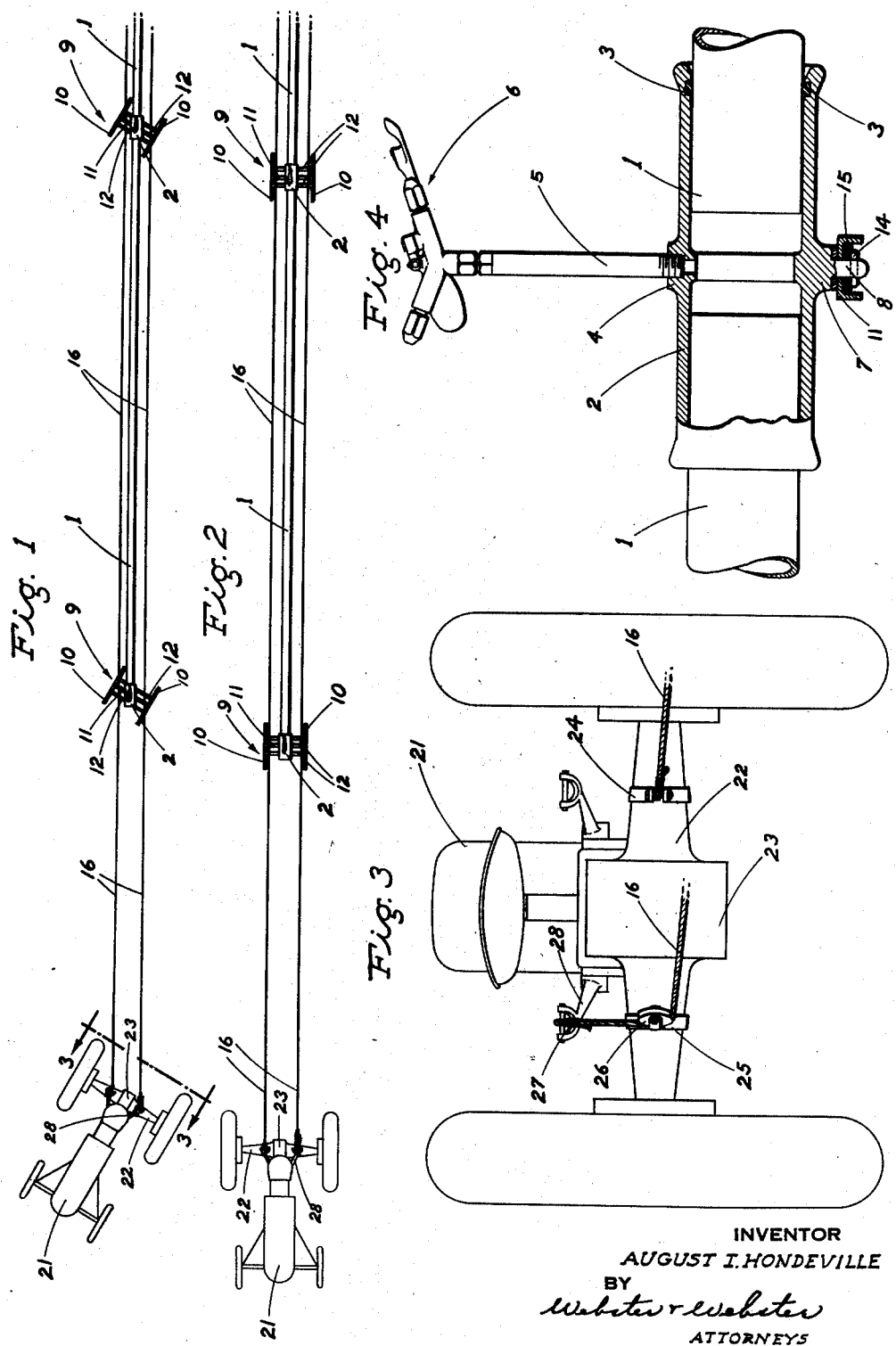
INVENTOR
AUGUST I. HONDEVILLE
BY
Webster & Webster
ATTORNEYS

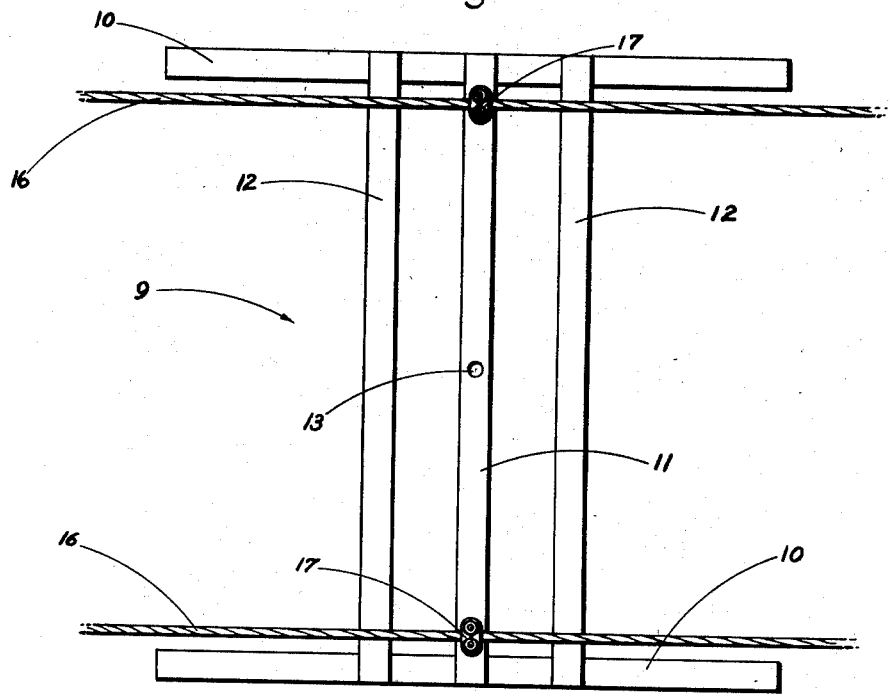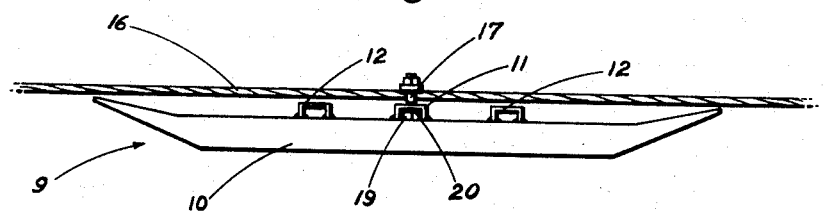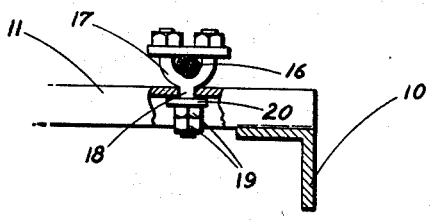

Patented May 18, 1954

2,678,844

UNITED STATES PATENT OFFICE 2,678,844

PORTABLE IRRIGATION SYSTEM

August I. Hondeville, Merced, Calif., assignor to Walter A. Hondeville, Merced, Calif.

Application January 14, 1952, Serial No. 266,265

5 Claims. (Cl. 299—47)

This invention is directed to, and it is a major object to provide, an improved, above-ground portable irrigation system; such system being of the general type which includes a longitudinal pipe line comprised of a plurality of lengths of pipe connected at adjacent ends by a coupling, with each coupling having a sprinkler unit upstanding therefrom.

Heretofore portable irrigation systems of this type required the dismantling, transfer of the separate parts, and reassembly thereof when the system was moved from point to point in the field being irrigated; such operation thus involving considerable labor and loss of time.

It is therefore another important object of this invention to provide a portable irrigation system which can be moved in the field without dismantling, and such movement being accomplished by hitching a tractor in draft relation to one end or the other of the irrigation system.

An additional object of the present invention is to provide a portable irrigation system, as above, wherein sections of pipe are connected at adjacent ends by couplings supported on sleds, and the sleds are in turn connected together by transversely spaced, longitudinal cables which extend on opposite sides of the pipe line, and which not only serve to maintain the parts of the system in assembly, but also are the draft means for said system.

Another object of the instant invention is to provide a portable irrigation system, as in the preceding paragraph, wherein the sleds are pivoted for part-turning about a vertical axis and to a diagonal position upon differential adjustment of the length of the cables, whereby said sleds—upon longitudinal advance of the system—cause a simultaneous lateral motion thereof. Thus, upon to and fro longitudinal shifting or travel of the portable irrigation system, it is caused to also shift laterally, so that it may be selectively disposed in the field without the necessity of dismantling.

A further object of the invention is to provide a portable irrigation system which, by reason of the cable connection of the sleds, may incorporate simplified pipe section couplings; i. e. couplings which require no mechanism for latching with the pipe sections.

It is also an object of the invention to provide a portable irrigation system which is designed for ease and economy of manufacture, and for ready and convenient use.

Still another object of the invention is to provide a practical and reliable portable irrigation system, and one which will be exceedingly effective for the purpose for which it is designed.

These objects are accomplished by means of such structure and relative arrangement of parts as will fully appear by a perusal of the following specification and claims.

In the drawings:

Fig. 1 is a diagrammatic plan view showing the system in part and with the cables differentially adjusted in length so that the sleds assume a diagonal position whereby to cause the system, when pulled longitudinally by a laterally angled tractor, to simultaneously shift laterally.

Fig. 2 is a similar view, but shows the cables adjusted to equal length whereby the system moves only longitudinally when the tractor is set to travel only lengthwise of the system.

Fig. 3 is an enlarged transverse section on line 3—3 of Fig. 1.

Fig. 4 is an enlarged fragmentary elevation, partly in section, showing one of the pipe section couplings and the corresponding sprinkler unit.

Fig. 5 is an enlarged plan view of one of the sleds showing the cables connected thereto; the sprinkler unit being omitted.

Fig. 6 is a side elevation of the sled as in Fig. 5.

Fig. 7 is an enlarged fragmentary transverse elevation, partly in section, showing one of the cable clamps and its manner of swivel attachment to the central cross bar of the related sled.

Referring now more particularly to the characters of reference on the drawings, the portable irrigation system comprises a pipe line made up of a plurality of pipe sections 1 disposed in end to end alinement and connected, at adjacent ends, by a horizontal tubular fitting 2. Each fitting 2 includes, in the end portions thereof, an internal annular seal 3 to prevent water leakage. While the pipe sections 1 are merely inserted in the fittings 2, without any latching mechanism being employed between the parts, the same cannot separate and the pipes and couplings together, and as a whole, form a substantially rigid and non-deflectible unit, for the reason as will hereinafter appear.

Each of the horizontal tubular fittings 2 is formed with a central top boss 4, and a relatively short standpipe 5 is threaded into the boss 4 in communication with the interior of said fitting 2. At its upper end each standpipe 5 carries a water jet actuated rotary sprinkler head, indicated generally at 6.

Each horizontal tubular fitting 2 is formed directly below the top boss 4 with a downwardly extending bottom boss 7 having an integral pivot pin 8 projecting downwardly therefrom.

Below each horizontal tubular fitting 2 there is a relatively wide sled, indicated generally at 9, each sled comprising transversely spaced, longitudinal skids 10 upturned at the ends, as shown; such skids being rigidly connected by a central cross bar 11 and other cross bars 12 in spaced relation on opposite sides thereof. The cross bars 11 and 12 are of inverted channel configuration, while the skids 10 are angle iron, with one flange depending as a runner.

The depending pivot pin 8 of each fitting 2 extends downwardly through a center hole 13 in the related cross bar 11, and is retained against upward escape by means of a cross key 14 through the pivot pin 8 below the cross bar 11; there being a washer 15 above said key.

With this arrangement each sled 9 is supported for horizontal part-rotary motion beneath the corresponding fitting 2; the bottom boss 7 supporting the fitting at a height so that each sled may turn without obstruction.

The sleds, as longitudinally spaced along the pipe line, are connected on opposite sides by longitudinal, transversely spaced cables 16; the cables thus lying on opposite sides of the pipe line, and being connected to the central cross bar 11 of each sled 9 as follows:

Adjacent its ends the central cross bar 11 of each sled 9 is fitted with an upstanding cable clamp 17 having an integral pivot pin 18 which extends downwardly through said cross bar 11 in turnable relation, with retention nuts 19 threaded on said pin below the cross bar, and with a washer 20 between said nuts and cross bar. With this arrangement the cable clamps 17 are free to swivel about a vertical axis upon part-rotary motion of the related sled 9.

At each end of the described portable irrigation system the cables 16 extend a distance beyond the corresponding sled for connection at transversely spaced points to the rear of a draft vehicle, such as a tractor 21. A preferred manner of attachment of the cables 16 to the tractor 21, for the purpose of ready differential adjustment in length of the cables is shown in Figs. 1-3 inclusive, and in detail in the latter.

The rear axle housing 22 of the tractor 21 is fitted, on opposite sides of the differential case 23, with attachment collars, indicated at 24 and 25.

One cable is non-adjustably attached to the collar 24, while the other cable passes about a direction-changing sheave 26 mounted on the collar 25 and thence extends upwardly to connection, as at 27, with an adjacent power actuated lift arm 28 included in the tractor.

The lift arm 28 is caused to move—by power— either upwardly or downwardly in response to manipulation of a control by the tractor operator, and with such motion of the lift arm 28 the cable which passes about the sheave 27 can be differentially adjusted in its effective length relative to the other cable.

Upon setting the tractor to travel at an acute angle to the longitudinal axis of the rigid pipe unit, and setting the sleds 9 to the same angle by raising or lowering the arm 28 to shorten or lengthen the corresponding cable 16, it will be found that the combined transverse and longitudinal advance of the tractor will be accompanied by a similar movement of the sleds and a corresponding lateral shifting of the pipe system as a whole; the skids 10 biting into the earth and causing such directional motion.

It will thus be recognized that by shifting the portable irrigation system longitudinally to and fro in the field, by connection of the tractor first to one end and then to the other end of the differentially adjusted cables, the entire system can be laterally advanced step by step in the field without the necessity of dismantling.

When it is desired to move the portable irrigation system longitudinally without lateral travel— i. e. dead ahead—the cables 16 are adjusted to equal length, as in Fig. 2, whereupon the tractor 21 pulls the system straight forward if the tractor is similarly set.

In each position of setting of the portable irrigation system in a field, the pipe line is of course coupled by a suitable conduit to a source of water under pressure.

As the longitudinally spaced sleds 9 are connected on opposite sides of the pipe line by the cables 16, separation of the parts of the system when it is in use cannot occur. Such cable connection of the sleds also permits the pipe sections to have simple slip engagement in the fittings 2 without necessity of catch mechanisms between the parts.

Also, by reason of the bottom pivotal connection of the fittings 2 with the sleds 9, the standpipes 5 are always maintained perpendicular, as is desirable for proper operation of the water jet actuated, rotary sprinkler heads 6.

The foregoing portable irrigation system, by reason of the novel features thereof herein described, permits of ready, convenient, and economical irrigation of a field with a minimum of manual attendance and loss of time upon shifting or transfer of the system from point to point in the field.

From the foregoing description it will be readily seen that there has been produced such a portable irrigation system as substantially fulfills the objects of the invention as set forth herein.

While this specification sets forth in detail the present and preferred construction of the portable irrigation system, still in practice such deviations therefrom may be resorted to as do not form a departure from the spirit of the invention, as defined by the appended claims.

Having thus described the invention, the following is claimed as new and useful, and upon which Letters Patent are desired:

1. In a portable irrigation system which includes a sprinkler supporting pipe line comprised of end to end pipe sections, and couplings connecting adjacent ends of the pipe sections and forming, with the pipe sections, a substantially rigid and non-deflectable unit; a sled beneath each coupling, means pivotally connecting each sled to the corresponding coupling for part-rotation about a vertical axis, a pair of longitudinal transversely spaced cables extending from end to end of the system with the pipe line between said cables, and means securing the cables to each sled on opposite sides of the related coupling.

2. In a portable irrigation system which includes a sprinkler supporting pipe line comprised of end to end pipe sections, and couplings connecting adjacent ends of the pipe sections; a sled beneath each coupling, means pivotally connecting each sled to the corresponding coupling for part-rotation about a vertical axis, a pair of longitudinal transversely spaced cables extending from end to end of the system with the pipe line between said cables, and means securing the cables to each sled on opposite sides of the related coupling; said last named means being adapted to swivel about a vertical axis, the cables being longitudinally extended beyond at least one of the endmost sleds, and means adapted to connect said extended cables, at transversely spaced points, to a draft vehicle for differential adjustment of the effective length of said cables.

3. A portable irrigation system, as in claim 2, adapted for draft connection to a tractor having a vertically movable power actuated lift arm, a tractor mounted sheave vertically spaced from said arm, one of the extended cables passing about the sheave, running to said lift arm, and attached to the latter; and means to attach the other extended cable to the tractor in transversely spaced relation to said sheave.

4. In a portable irrigation system which includes a sprinkler supporting pipe line comprised of end to end pipe sections, and couplings connecting adjacent ends of the pipe sections; a sled beneath each coupling, each sled including transversely spaced longitudinal runners and a cross member rigidly connecting the same, means pivotally mounting the corresponding coupling on each cross member intermediate its ends and for part-rotation of the sled about a vertical axis, a pair of longitudinal transversely spaced pull cables extending from end to end of the system with the pipe line between said cables, and means swivelly attaching the cables to the cross member on opposite sides of the related coupling.

5. In a portable irrigation system which includes a sprinkler supporting pipe line comprised of end to end pipe sections, and couplings connecting adjacent ends of the pipe sections; a sled beneath each coupling, means securing the couplings to the sleds, and transversely spaced longitudinal tension draft elements extending between and attached to the sleds laterally of opposite sides of the couplings, said elements being extended longitudinally beyond at least one of the endmost sleds for draft connection with a power vehicle; means pivoting the sleds on the corresponding couplings for rotation about a vertical axis, and means on the vehicle to shorten or lengthen the effective length of one element relative to the other.

References Cited in the file of this patent
UNITED STATES PATENTS

| Number | Name | Date |
|---|---|---|
| 288,222 | Flad | Nov. 13, 1883 |
| 872,490 | Williamson | Dec. 3, 1907 |
| 955,601 | Lombard | Apr. 19, 1910 |
| 1,429,756 | Mitchell | Sept. 19, 1922 |
| 1,966,783 | Balaam | July 17, 1934 |
| 2,433,269 | Fellabaum | Dec. 23, 1947 |